US010994607B2

(12) United States Patent
Ishibashi et al.

(10) Patent No.: US 10,994,607 B2
(45) Date of Patent: May 4, 2021

(54) ROTATION TRANSFER APPARATUS PROVIDED WITH TORQUE MEASURING DEVICE

(71) Applicant: NSK LTD., Tokyo (JP)

(72) Inventors: Teruaki Ishibashi, Fujisawa (JP); Fumiaki Soda, Fujisawa (JP)

(73) Assignee: NSK LTD., Tokyo (JP)

( * ) Notice: Subject to any disclaimer, the term of this patent is extended or adjusted under 35 U.S.C. 154(b) by 559 days.

(21) Appl. No.: 16/065,573

(22) PCT Filed: Sep. 29, 2016

(86) PCT No.: PCT/JP2016/078795
§ 371 (c)(1),
(2) Date: Jun. 22, 2018

(87) PCT Pub. No.: WO2017/110191
PCT Pub. Date: Jun. 29, 2017

(65) Prior Publication Data

US 2020/0171938 A1 Jun. 4, 2020

(30) Foreign Application Priority Data

Dec. 25, 2015 (JP) ............................ JP2015-252766

(51) Int. Cl.
*B60K 17/02* (2006.01)
*B60K 17/08* (2006.01)
(Continued)

(52) U.S. Cl.
CPC .............. *B60K 17/02* (2013.01); *B60K 17/08* (2013.01); *F16H 3/087* (2013.01); *G01L 3/101* (2013.01);
(Continued)

(58) Field of Classification Search
CPC ........... B60K 17/02; B60K 17/08; F16H 3/12; F16H 3/087; F16H 3/093;
(Continued)

(56) References Cited

U.S. PATENT DOCUMENTS 4,150,566 A * 4/1979 Loebel .................... G01L 3/109 73/862.328
4,592,241 A 6/1986 Obayashi et al.
(Continued)

FOREIGN PATENT DOCUMENTS

CN 1401060 A 3/2003
CN 1637310 A 7/2005
(Continued)

OTHER PUBLICATIONS

Search Report dated Oct. 25, 2016, issued by the International Searching Auhority in counterpart International Application No. PCT/JP2016/078795 (PCT/ISA/210).

(Continued)

*Primary Examiner* — Victor L MacArthur
(74) *Attorney, Agent, or Firm* — Sughrue Mion, PLLC

(57) ABSTRACT

First and second encoders are fixed to a drive plate and a clutch cover of which the center portions are connected to each other via a connection shaft and which are disposed between, in a transfer path for torque outputted from an engine, a damper and a connecting/disconnecting part of a clutch mechanism of a transmission. At the same time, detection units of first and second sensors are opposed to portions to be detected of the first and second encoders, respectively.

6 Claims, 1 Drawing Sheet

(51) Int. Cl.
*F16H 3/087* (2006.01)
*G01L 3/10* (2006.01)
*F16H 3/093* (2006.01)
*F16H 3/12* (2006.01)

(52) U.S. Cl.
CPC ................ *F16H 3/093* (2013.01); *F16H 3/12* (2013.01); *F16H 2003/0931* (2013.01); *F16H 2200/0043* (2013.01)

(58) Field of Classification Search
CPC ..... F16H 2003/0931; F16H 2200/0043; G01L 3/101; G01L 3/104; G01L 3/109
See application file for complete search history.

(56) References Cited

U.S. PATENT DOCUMENTS 4,907,460 A * 3/1990 Taniguchi ............... G01L 3/105
73/862.331
5,247,839 A * 9/1993 Okutani .................... G01L 3/12
73/862.324
5,265,480 A * 11/1993 Tsuji ....................... G01L 3/104
73/862.325
5,485,757 A * 1/1996 Foxwell ................ G01L 3/1421
73/862.321
8,296,038 B2 * 10/2012 Verdejo ................. F02D 41/022
701/102
2003/0051577 A1 3/2003 Hirt
2005/0139442 A1 6/2005 Agner et al.
2012/0325020 A1 12/2012 Mueller
2016/0195183 A1 7/2016 Matsuda et al.
2016/0195442 A1 7/2016 Saito et al.
2017/0227111 A1 8/2017 Matsuda et al.

FOREIGN PATENT DOCUMENTS

CN 102667434 A 9/2012
CN 203770450 U 8/2014
DE 199 47 377 A1 4/2001
EP 2 735 754 A1 5/2014
JP 59-204733 A 11/1984
JP H01-199129 A 8/1989
JP H06-346945 A 12/1994
JP 8-507372 A 8/1996
JP H11-125583 A 5/1999
JP 3444163 B2 9/2003
JP 2010-180975 A 8/2010
JP 2014-29328 A 2/2014
WO 94/19671 A1 9/1994

OTHER PUBLICATIONS

Written Opinion dated Oct. 25, 2016, issued by the International Searching Auhority in counterpart International Application No. PCT/JP2016/078795 (PCT/ISA/237).
Communication dated Oct. 12, 2019 issued by the State Intellectual Property Office of P.R. China in counterpart Chinese Application No. 201680076293.9.
Communication dated Nov. 29, 2018, issued by the European Patent Office in counterpart European Application No. 16878089.8.
Communication dated Mar. 17, 2020, from the Japanese Patent Office in counterpart application No. 2017-557742.

* cited by examiner

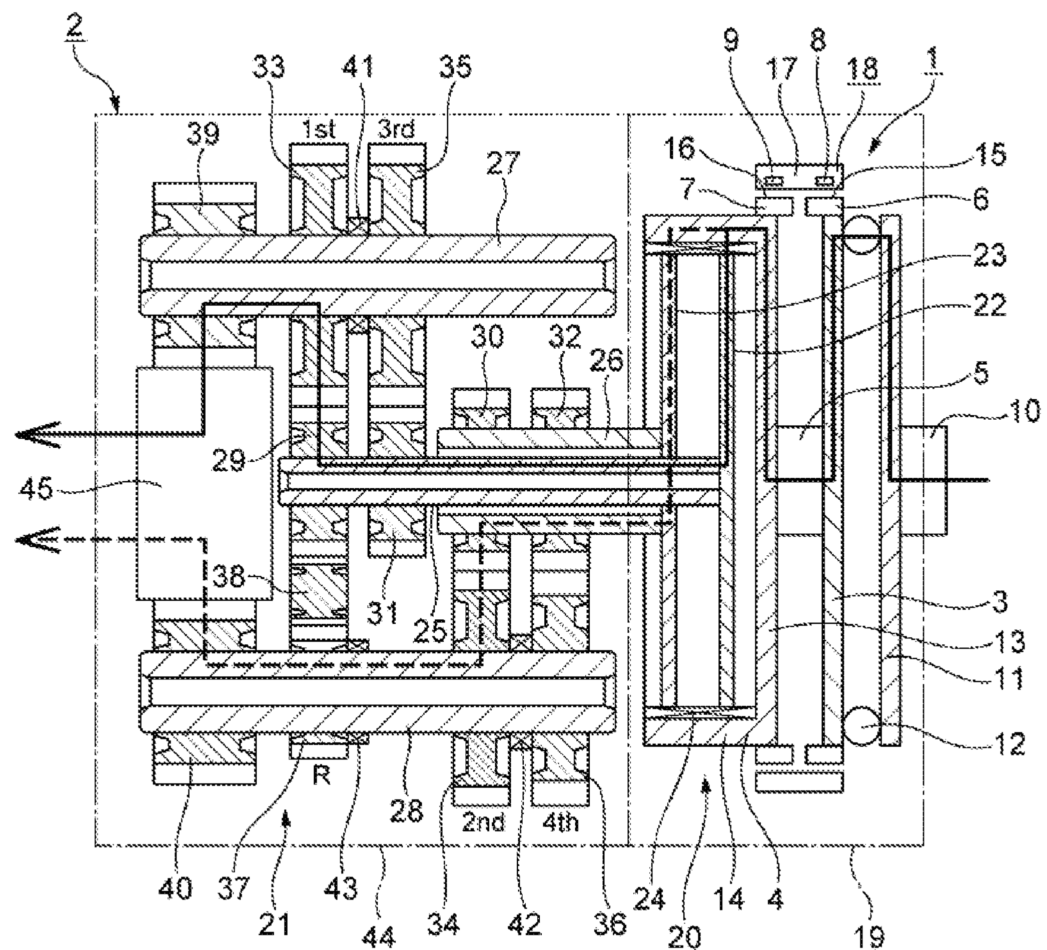
2
33
41
35
1st
3rd
39
27
9
8
17
18
1
16
15
7
6
23
22
30
32
26
5
10
29
45
38
31
25
3
13
11
12
R
2nd
4th
28
40
37
43
21
44
34
42
36
24
14
4
20
19

ROTATION TRANSFER APPARATUS PROVIDED WITH TORQUE MEASURING DEVICE

TECHNICAL FIELD

The present invention relates to a rotation transmission apparatus with a torque measurement device.

BACKGROUND ART

At present, in order to promote high efficiency and low fuel consumption of an automobile, it is required to measure the magnitude of an output torque of an engine to perform optimum output control of the engine (including output control synchronized with a motor in a hybrid car). As a method of measuring the magnitude of the output torque of the engine, for example, a method of measuring magnitude of torque transmitted by a torque transmission member present at a downstream side of the engine is conceivable.

Conventionally, as the method of measuring magnitude of torque transmitted by a torque transmission member, there has been known a method of converting an elastic twist deformation amount of the torque transmission member into a phase difference between output signals of a pair of sensors and measuring the magnitude of torque based on the phase difference.

As an application example of such a method, Patent Document 1 describes a device for converting an elastic twist deformation amount of any one of torque transmission shafts (input shaft, countershaft, and the like) constituting a transmission mechanism of an automobile in a clutch mechanism and the transmission mechanism constituting a transmission of an automobile into a phase difference between output signals of a pair of sensors and measuring the magnitude of the torque transmitted by the torque transmission shaft based on the phase difference.

However, in such a conventional structure, since a pair of encoders and sensors for measuring torque are installed in a transmission case where a large number of components constituting the transmission mechanism are densely stored, there is a case where a degree of freedom of installation of the pair of encoders and sensors is low and design of the transmission is difficult. In a case where the transmission is a dual clutch transmission (DCT), a transmission path of torque inside the transmission mechanism is changed by a speed stage during traveling (first speed, second speed, or the like), and a transmission path of torque is branched inside the transmission mechanism when a speed stage during traveling is changed (shift change). Therefore, it is difficult to accurately determine the magnitude of the output torque of the engine only by measuring the magnitude of the torque transmitted by any one of the torque transmission shafts.

PRIOR ART DOCUMENT

Patent Document

Patent Document 1: JP-A-2014-29328

SUMMARY OF THE INVENTION

Problems to be Solved by the Invention

The present invention has been made in view of the above circumstances and realized a structure where installation of an encoder and a sensor for measuring magnitude of torque is easy and magnitude of output torque of an engine can be easily determined regardless of the type of a transmission.

Means for Solving the Problems

A rotation transmission apparatus with a torque measurement device of the present invention includes a pair of rotary bodies, a connection member, a first encoder, a second encoder, a first sensor, and a second sensor.

The pair of rotary bodies are provided in series with each other along a transmission path at a part between a damper for absorbing rotation fluctuation of the engine and a connection/disconnection portion of a clutch mechanism of a transmission in a transmission path of output torque of the engine from a crankshaft of the engine to a transmission mechanism of the transmission.

The connection member coaxially connects the pair of rotary bodies so as to transmit torque. As such a connection member, for example, a connection shaft whose outer diameter dimension is smaller than the outer diameter dimension of each of the pair of rotary bodies and which coaxially connects center portions of the pair of rotary bodies so as to transmit torque may be adopted.

The first encoder is fixed to one of the pair of rotary bodies and includes a detected portion which alternately changes characteristics in a circumferential direction.

The second encoder is fixed to the other of the pair of rotary bodies and includes a detected portion which alternately changes characteristics in a circumferential direction.

The first sensor is supported on a part which is non-rotatable during use while a detecting portion of the first sensor faces the detected portion of the first encoder and is configured to change an output signal according to a characteristic change of the detected portion of the first encoder which faces the detecting portion of the first sensor.

The second sensor is supported on a part which is non-rotatable during use while a detecting portion of the second sensor faces the detected portion of the second encoder and is configured to change an output signal according to a characteristic change of the detected portion of the second encoder which faces the detecting portion of the second sensor.

Further, the rotation transmission apparatus of the present invention is configured to measure output torque of the engine based on a phase difference between the output signals of the first sensor and the second sensor.

Effect of the Invention

According to the rotation transmission apparatus of the present invention, the first and second encoders and the first and second sensors for measuring the magnitude of the torque is easily installed, and the magnitude of the output torque of the engine can be easily determined regardless of the type of transmission.

That is, in the present invention, the first and second encoders are fixed to the pair of rotary bodies are provided in series with each other along the transmission path on the part between the damper for absorbing rotation fluctuation of the engine and the connection/disconnection portion of the clutch mechanism of the transmission in the transmission path of output torque of the engine from the crankshaft of the engine to the transmission mechanism of the transmission. The detecting portion of the first sensor faces the detected portion of the first encoder, and the detecting portion of the second sensor faces the detected portion of the second encoder. The density of components around the pair of rotary bodies is lower (or easy to lower) than the density of components constituting the transmission mechanism. Therefore, in the present invention, the first and second encoders and the first and second sensors can be easily installed (the degree of freedom of installation can be increased) compared with a case where the first and second encoders and the first and second sensors are installed in the transmission mechanism. Further, in the present invention, the output torque of the engine can be measured before being input to the transmission mechanism. Therefore, even in a case where the transmission is a dual clutch transmission, a torque transmission path inside the transmission mechanism changes according to the speed stage during traveling (first speed, second speed, and the like), and the transmission path of the torque branches inside the transmission mechanism when a speed stage during traveling is changed (shift change), the magnitude of the output torque of the engine can be measured before such an event occurs. Therefore, in the present invention, the magnitude of the output torque of the engine can be easily determined regardless of the type of the transmission.

BRIEF DESCRIPTION OF DRAWINGS

FIG. 1 is a schematic cross-sectional view of a transmission including a rotation transmission apparatus with a torque measurement device showing an example of an embodiment of the present invention.

DESCRIPTION OF EMBODIMENTS

First Example of Embodiment

A first example of an embodiment of the present invention will be described with reference to FIG. 1.

A rotation transmission apparatus 1 with a torque measurement device of this example is used in a state of being incorporated in a transmission 2 for an automobile and includes a drive plate 3, a clutch cover 4, a connection shaft 5, a first encoder 6, a second encoder 7, a first sensor 8, and a second sensor 9.

In the following description relating to this example, "one side" refers to the left side of FIG. 1 in an axial direction, and "the other side" refers to the right side of FIG. 1 in the axial direction.

As shown in FIG. 1, a disc-shaped flywheel 11 is coaxially connected and fixed to a crankshaft 10 at one end portion in the axial direction of the crankshaft 10 of the engine.

The drive plate 3 is formed in a disc shape and is disposed on one side of the flywheel 11 in the axial direction coaxially with the flywheel 11. In this state, the drive plate 3 is connected to the flywheel 11 via a damper 12 for absorbing rotation fluctuation of the engine so as to transmit torque. In this example, the drive plate 3 corresponds to one of the pair of rotary bodies described in the claims.

The clutch cover 4 is formed in a cylindrical shape having a bottom and includes a disc-shaped bottom plate portion and a tubular portion 14 extending from a radially outer end portion of the bottom plate portion 13 to one side in the axial direction. The clutch cover 4 is disposed on one side of the drive plate 3 in the axial direction coaxially with the drive plate 3. In this example, the clutch cover 4 corresponds to the other of the pair of rotary bodies described in the claims.

Both end portions in the axial direction of the connection shaft 5 are coupled to the center portion of the bottom plate portion 13 constituting the clutch cover 4 and the center portion of the drive plate 3 so as to transmit torque. In this example, the connection shaft 5 corresponds to a connection member described in the claims.

The first encoder 6 is externally fitted and fixed to an outer circumferential surface of the drive plate 3. Therefore, the first encoder 6 can rotate (synchronize) with the outer circumferential surface of the drive plate 3.

The second encoder 7 is externally fitted and fixed to an outer circumferential surface of the bottom plate portion 13 constituting the clutch cover 4. Therefore, the second encoder 7 can rotate (synchronize) with the outer circumferential surface of the bottom plate portion 13.

An outer circumferential surface of the first encoder 6 serves as a first detected portion 15, and an outer circumferential surface of the second encoder 7 serves as a second detected portion 16. The first and second detected portions 15, 16 have the same diameter, and are closely disposed in a state coaxial with each other and adjacent to each other in the axial direction. In the first and second detected portions 15, 16, S poles and N poles are alternately disposed at equal pitches in the circumferential direction such that magnetic characteristics are alternately changed at equal pitches in the circumferential direction. Total numbers of magnetic poles (S poles and N poles) of the first and second detected portions 15, 16 are equal to each other.

A first sensor 8 and a second sensor 9 are embedded in a holder 17 formed of a synthetic resin to constitute a sensor unit 18. A magnetic detection element such as a Hall element, a Hall IC, an MR element (including a GMR element, a TMR element, and an AMR element) is disposed in each of a first detecting portion which is a detecting portion of the first sensor 8 and a second detecting portion which is a detecting portion of the second sensor 9. The sensor unit 18 is supported and fixed to a clutch housing 19 which is non-rotatable even during use while the first detecting portion of the first sensor 8 closely faces the first detected portion 15 of the first encoder 6 and the second detecting portion of the second sensor 9 closely faces the second detected portion 16 of the second encoder 7. Therefore, the first sensor 8 changes an output signal according to a change in the magnetic characteristic of the first detected portion 15, and the second sensor 9 changes an output signal according to a change in the magnetic characteristic of the second detected portion 16. In this example, the output signals of the first and second sensors 8, 9 are transmitted to a calculator (not shown) through a harness (not shown) drawn out from the sensor unit 18.

The transmission 2 to which the above-described rotation transmission apparatus 1 of this example is assembled is a dual clutch transmission and includes a clutch mechanism 20 and a transmission mechanism 21.

The clutch mechanism 20 includes a clutch cover 4, a first clutch plate 22, a second clutch plate 23, and a connection/disconnection switch 24 and is housed in the clutch housing 19 together with the flywheel 11, the damper 12, the drive plate 13, the connection shaft 5, the first and second encoders 6, 7, and the sensor unit 18.

The first and second clutch plates 22, 23 are respectively disposed coaxially with the clutch cover 4 while being separated from each other in the axial direction on the radially inner side of the tubular portion 14 constituting the clutch cover 4. The second clutch plate 23 is disposed on one side of the first clutch plate 22 in the axial direction.

The connection/disconnection switch 24 is configured to switch between a state in which the first clutch plate 22 and the second clutch plate 23 are connected to the tubular portion 14 constituting the clutch cover 4 respectively so as to transmit torque (frictionally engaged via another member by introducing oil pressure) and a state of not connecting in torque transmittable manner. In this example, portions between the tubular portion 14 and the first and second clutch plates 22, 23 correspond to a connection/disconnection portion described in the claims.

The transmission mechanism 21 includes a first input shaft 25, a second input shaft 26, a first countershaft 27, a second countershaft 28, first to fourth speed stage drive gears 29 to 32, first to fourth speed stage driven gears 33 to 36, a reverse gear 37, an intermediate gear 38, a first output gear 39, a second output gear 40, and first to third synchromesh mechanisms 41 to 43, and is housed in a transmission case 44.

The first input shaft 25 is rotatably supported by a bearing (not shown) in a transmission case 44 in a state of being disposed coaxially with the clutch cover 4. The first clutch plate 22 is supported at the other end of the first input shaft 25 in the axial direction so as to transmit torque.

The second input shaft 26 is a cylindrical hollow shaft and is disposed concentrically (coaxially) with the first input shaft 25 by inserting an axially intermediate portion of the first input shaft 25 into the radially inner side. In this state, the second input shaft 26 is rotatably supported by a bearing (not shown) on an outer circumferential surface of the axially intermediate portion of the first input shaft 25 and is rotatably supported by a bearing (not shown) in the transmission case 44. The second clutch plate 23 is supported at the other end of the second input shaft 26 in the axial direction so as to transmit torque.

The first and second countershafts 27, 28 are rotatably supported by bearings (not shown) in the transmission case 44 in a state of being disposed parallel to the first and second input shafts 25, 26, respectively.

The first speed stage drive gear 29 and the third speed stage drive gear 31 which are odd-number speed stage drive gears in the first to fourth speed stage drive gears 29 to 32 are respectively supported so as to transmit torque in a state of being separated from each other in the axial direction at a portion projecting from the radially inner side of the second input shaft 26 to one side in the axial direction on the outer circumferential surface of the first input shaft 25.

The second speed stage drive gear 30 and the fourth speed stage drive gear 32 which are even-number speed stage drive gears in the first to fourth speed stage drive gears 29 to 32 are each supported so as to transmit torque in a state of being separated from each other in the axial direction on the outer circumferential surface of the second input shaft.

The first speed stage driven gear 33 and the third speed stage driven gear 35 which are odd-number speed stage driven gears in the first to fourth speed stage driven gears 33 to 36 are supported so as to rotate relatively to the first countershaft 27 in a state of being separated from each other in the axial direction at an axially intermediate portion on the outer circumferential surface of the first countershaft 27. In this state, the first speed stage driven gear 33 is always meshed with the first speed stage drive gear 29, and the third speed stage driven gear 35 is always meshed with the third speed stage drive gear 31.

The second speed stage driven gear 34 and the fourth speed stage driven gear 36, which are even-number speed stage driven gears in the first to fourth speed stage driven gears 33 to 36, are supported so as to rotate relatively to the second countershaft 28 in a state of being separated from each other in the axial direction at the other end in the axial direction on the outer circumferential surface of the second countershaft 28. In this state, the second speed stage driven gear 34 is always meshed with the second speed stage drive gear 30, and the fourth speed stage driven gear 36 is always meshed with the fourth speed stage drive gear 32.

The reverse gear 37 is supported at an axially intermediate portion on the outer circumferential surface of the second countershaft 28 so as to rotate relatively to the second countershaft 28. In this state, the reverse gear 37 is always meshed with the first speed stage drive gear 29 via the intermediate gear 38. The intermediate gear 38 is rotatably supported by a support shaft and a bearing (not shown) in the transmission case 44.

The first output gear 39 is supported so as to transmit torque on one end of the outer circumferential surface of the first countershaft 27 in the axial direction. The second output gear 40 is supported so as to transmit torque on one end of the outer circumferential surface of the second countershaft 28 in the axial direction. In this state, the first and second output gears 39, 40 are always meshed with a ring gear 45 constituting a differential device (differential gear) separately.

The first synchromesh mechanism 41 is disposed in a state of bridging between the first countershaft 27, and the first speed stage driven gear 33 and the third speed stage driven gear 35. The first synchromesh mechanism 41 is configured to switch between a state in which both the first speed stage driven gear 33 and the third speed stage driven gear 35 are supported so as to rotate relatively to the first countershaft 27 (neutral state) and a state in which only any one of the first speed stage driven gear 33 and the third speed stage driven gear 35 is connected to the first countershaft 27 so as to transmit torque.

The second synchromesh mechanism 42 is disposed in a state of bridging between the second countershaft 28, and the second speed stage driven gear 34 and the fourth speed stage driven gear 36. The first synchromesh mechanism 42 is configured to switch between a state in which both the second speed stage driven gear 34 and the fourth speed stage driven gear 36 are supported so as to rotate relatively to the second countershaft 27 (neutral state) and a state in which only any one of the second speed stage driven gear 34 and the fourth speed stage driven gear 36 is connected to the second countershaft 28 so as to transmit torque.

The third synchromesh mechanism 42 is disposed in a state of bridging between the second countershaft 28 and the reverse gear 37. The third synchromesh mechanism 43 is configured to switch between a state in which the reverse gear 37 is supported so as to rotate relatively to the second countershaft 28 (neutral state) and a state in which the reverse gear 37 is connected to the second countershaft 28 so as to transmit torque.

Next, movement of the transmission 2 of this example having the above-described configuration will be described. After the engine started, a control device (not shown) operates the clutch mechanism 20 and the first to third synchromesh mechanisms 41 to 43 according to a driving state of an automobile (accelerator opening degree, engine rotating speed, vehicle speed, and the like), and appropriately switches the speed stage (gear stage).

In a stopped state of the automobile after the engine started, the clutch cover 4 constituting the clutch mechanism 20 and the first and second clutch plates 22, 23 are both disconnected, and the first to third synchromesh mechanisms 41 to 43 are in a neutral state respectively.

From this state, when a driver moves a shift lever to an advance position in order to cause the automobile to travel, the first synchromesh mechanism 41 switches a state of the first speed stage driven gear 33 and the first countershaft 27 to a state in which torque transmission is possible, thereby forming a connected state of the first speed stage. Further, from this state, when the accelerator opening degree increases and the engine exceeds a predetermined rotation speed, the clutch cover 4 and the first clutch plate 22 are connected by the connection/disconnection switch 24. As a result, as indicated by a thick solid line in FIG. 1, the output torque of the engine transmitted in an order of the crankshaft 10, the flywheel 11, the damper 12, the drive plate 3, the connection shaft 5, and the clutch cover 4 is further transmitted in an order of the clutch cover 4, the first clutch plate 22, the first input shaft 25, the first speed stage drive gear 29, the first speed stage driven gear 33, the first countershaft 27, the first output gear 39, and the ring gear 45, and the automobile starts to travel at the first speed stage.

Next, in a case where the automobile is switched from traveling at the first speed stage to traveling at the second speed stage (shift change is performed), first, the second synchromesh mechanism 42 switches a state of the second speed stage driven gear 34 and the second countershaft 28 to a state in which torque transmission is possible, thereby forming a connected state of the second speed stage. Thereafter, the connection of the first and the second clutch plates 22, 23 to the clutch cover 4 is changed by the connection/disconnection switch 24, and the clutch cover 4 and the first clutch plate 22 are disconnected, while the clutch cover 4 and the second clutch plate 23 are connected. As a result, as indicated by a broken line in FIG. 1, the output torque of the engine is transmitted in an order of the clutch cover 4, the second clutch plate 23, the second input shaft 26, the second speed stage drive gear 30, the second speed stage driven gear 34, the second countershaft 28, the second output gear 40, and the ring gear 45, and the automobile starts to travel at the second speed stage.

Incidentally, connection of the first and second clutch plates 22, 23 to the clutch cover 4 is changed in a mode in which the clutch cover 4 and the second clutch plate 23 are gradually connected (friction engagement via another member) while gradually releasing connection between the clutch cover 4 and the first clutch plate 22 (friction engagement via another member). That is, while the connection of the first and second clutch plates 22, 23 to the clutch cover 4 is changed, a state in which the clutch cover 4 and the first clutch plate 22 are connected by a half clutch and a state in which the clutch cover 4 and the second clutch plate 23 are connected by a half clutch temporarily exist. Therefore, during this period, a transmission path of the output torque of the engine inside the transmission mechanism 21 is branched into a transmission path indicated by a thick solid line and a transmission path indicated by a thick broken line in FIG. 1.

In the transmission 2 of this example, switch (shift change) to traveling at the third speed stage and the fourth speed stage, and the reverse traveling is performed in the similar manner to switch (shift change) to traveling at the first speed stage and the second speed stage described above.

In particular, in the transmission 2 of this example, even when switch to traveling at any speed stage is performed, a connection state of this speed stage is formed in advance, and change of the connection of the first and second clutch plates 22, 23 to the clutch cover 4 is performed such that mutual connections temporarily exist, so shift shock and torque loss can be prevented from occurring.

In the rotation transmission apparatus with a torque measurement device of this example having the configuration as described above, when the output torque of the engine is transmitted from the crankshaft 10 to the transmission 2, the output signals of the first and second sensors 8, 9 constituting the sensor unit 18 change periodically with the rotation of the first and second encoders 6, 7 and the drive plate 3 and the clutch cover 4. Here, the frequency (and period) of this change takes a value according to the rotational speed of the drive plate 3 and the clutch cover 4. Therefore, if a relationship between the frequency (or period) and the rotational speed is investigated in advance, the rotational speed is obtained based on the frequency (or period). When the output torque of the engine is transmitted from the crankshaft 10 to the transmission 2, the connection shaft 5 twist-deforms elastically, and the bottom plate portion 13 constituting the clutch cover 4 and the drive plate 3 elastically deform in the circumferential direction respectively, while the first and second encoders 6, 7 are displaced relatively in the rotational direction. Also, the first and second encoders 6, 7 are displaced relatively in the rotational direction in this manner, and as a result, a phase difference ratio (=phase difference/one period) between the output signals of the first and second sensors 8, 9 changes. Here, the phase difference ratio is a value according to the output torque of the engine. Therefore, if the relationship between the phase difference ratio and the output torque is investigated in advance, the output torque is obtained based on the phase difference ratio.

In particular, according to the rotation transmission apparatus 1 with a torque measuring device of this example, the first and second encoders 6, 7 and the first and second sensors 8, 9 for measuring the magnitude of the output torque of the engine can be easily installed, and the magnitude of the output torque of the engine can be easily determined even though the transmission 2 is a dual clutch transmission.

In this example, the first encoder 6 is externally fitted and fixed to the outer circumferential surface of the drive plate 3, the second encoder 7 is externally fitted and fixed to the outer circumferential surface of the bottom plate portion 13 constituting the clutch cover 4, and the first detecting portion of the first sensor 8 faces the first detected portion 15 of the first encoder 6, the second detecting portion of the second sensor 9 faces the second detected portion 15 of the second encoder 7. The density of components around the drive plate 3 and the clutch cover 4 is lower (or easy to lower) than the density of components constituting the transmission mechanism 21 of the transmission 2. Therefore, in this example, the first and second encoders 6, 7 and the first and second sensors 8, 9 can be easily installed (the degree of freedom of installation can be increased) compared with a case where the first and second encoders 6, 7 and the first and second sensors 8, 9 are installed in the transmission mechanism 21 of the transmission 2. Further, in this example, the output torque of the engine can be measured at a part between the drive plate 3 and the clutch cover 4. In other words, the output torque of the engine can be measured before being input to the transmission mechanism 21. Therefore, even in this example in which a torque transmission path inside the transmission mechanism 21 changes according to the speed stage during traveling and the transmission path of the torque branches inside the transmission mechanism 21 when a speed stage during traveling is changed (shift change), the magnitude of the torque can be measured before such an event occurs. Therefore, in this example, the magnitude of the output torque of the engine can be easily determined even though the transmission 2 is a dual clutch transmission.

In this example, since the damper 12 does not exist between portions where the first and second encoders 6, 7 are installed, it is possible to prevent an inconvenience that abnormal vibration due to resonance occurring in the damper 12 becomes noise in torque measurement.

INDUSTRIAL APPLICABILITY

In the above-described embodiment, the present invention is applied to a structure in which the damper is provided on the upstream side of the transmission path of the output torque of the engine and the clutch mechanism is provided on the downstream side. However, the present invention can also be applied to a structure in which the clutch mechanism is provided on the upstream side of the transmission path and the damper is provided on the downstream side.

The phase difference between the output signals of the first and second encoders varies not only by elastic twist deformation of the connection shaft but also by elastic deformation in the circumferential direction of a pair of rotary bodies. Therefore, when the elastic twist deformation of the connection shaft per unit torque is small, the thickness of at least any one of a pair of rotary bodies is reduced and the amount of elastic deformation in the circumferential direction of the any one of rotary bodies per unit torque is increased, thereby ensuring sensitivity of the torque measurement.

The present application is based on Japanese Patent Application No. 2015-252766 filed on Dec. 25, 2015, the contents of which are incorporated herein by reference.

DESCRIPTION OF REFERENCE NUMERALS

1 rotation transmission apparatus with torque measurement device
2 transmission
3 drive plate
4 clutch cover
5 connection shaft
6 first encoder
7 second encoder
8 first sensor
9 second sensor
10 clutch shaft
11 flywheel
12 damper
13 bottom plate portion
14 tubular portion
15 first detected portion
16 second detected portion
17 holder
18 sensor unit
19 clutch housing
20 clutch mechanism
21 transmission mechanism
22 first clutch plate
23 second clutch plate
24 connection/disconnection switch
25 first input shaft
26 second input shaft
27 first countershaft
28 second countershaft
29 first speed stage drive gear
30 second speed stage drive gear
31 third speed stage drive gear
32 fourth speed stage drive gear
33 first speed stage driven gear
34 second speed stage driven gear
35 third speed stage driven gear
36 fourth speed stage driven gear
37 reverse gear
38 intermediate gear
39 first output gear
40 second output gear
41 first synchromesh mechanism
42 second synchromesh mechanism
43 third synchromesh mechanism
44 transmission case
45 ring gear

The invention claimed is:

1. A rotation transmission apparatus with a torque measurement device, comprising:

a pair of rotary bodies which are provided in series with each other along a transmission path at a part between a damper for absorbing rotation fluctuation of an engine and a connection/disconnection portion of a clutch mechanism of a transmission in a transmission path of output torque of the engine from a crankshaft of the engine to a transmission mechanism of the transmission;

a connection member which coaxially connects the pair of rotary bodies at rotation centers thereof so as to transmit torque;

a first encoder which is fixed to one of the pair of rotary bodies and includes a detected portion which alternately changes characteristics in a circumferential direction;

a second encoder which is fixed to the other of the pair of rotary bodies and includes a detected portion which alternately changes characteristics in a circumferential direction;

a first sensor which is supported on a part which is non-rotatable during use while a detecting portion of the first sensor faces the detected portion of the first encoder, and is configured to change an output signal according to a characteristic change of the detected portion of the first encoder which faces the detecting portion of the first sensor; and a second sensor which is supported on a part which is non-rotatable during use while a detecting portion of the second sensor faces the detected portion of the second encoder, and is configured to change an output signal according to a characteristic change of the detected portion of the second encoder which faces the detecting portion of the second sensor, wherein the output torque of the engine is measured based on a phase difference between the output signals of the first sensor and the second sensor.

2. The rotation transmission apparatus according to claim 1, wherein the damper is disposed between a flywheel coupled to the crankshaft and the one of the pair of rotary bodies.

3. The rotation transmission apparatus according to claim 2, wherein the other of the pair of rotary bodies is a bottom plate portion of a cylindrical clutch cover having a bottom in which a tubular portion is provided on an opposite surface of a surface facing the one of the pair of rotary bodies, and wherein the connection/disconnection portion of the clutch mechanism is configured by a clutch plate disposed inside the tubular portion of the clutch cover and a connection/disconnection switch which is configured to connect and disconnect torque transmission from an inside of the tubular portion to the clutch plate.

4. The rotation transmission apparatus according to claim 3, wherein the clutch plate includes a first clutch plate and a second clutch plate, and the first clutch plate and the second clutch plate are disposed coaxially with the clutch cover in a state of being separated from each other.

5. The rotation transmission apparatus according to claim 4, wherein one end of a first input shaft extending to the transmission mechanism is supported so as to transmit torque on a center portion of the first clutch plate disposed on a side close to the bottom plate portion, wherein one end of a second input shaft which is a hollow shaft extending to the transmission mechanism is supported so as to transmit torque on a center portion of the second clutch plate disposed on a side far from the bottom plate portion, and wherein an axially intermediate portion of the first input shaft is inserted into a radially inner side of the hollow shaft which is the second input shaft extending to the transmission mechanism.

6. The rotation transmission apparatus according to claim 1, wherein each of the detected portions of the first encoder and second encoder is disposed with S poles and N poles alternately at equal pitches in the circumferential direction, and wherein a magnetic detection element is disposed in each of the detecting portions of the first sensor and second sensor.

* * * * *